United States Patent [19]

Standiford

[11] 4,428,799

[45] * Jan. 31, 1984

[54] PRODUCTION OF CONCENTRATED ALCOHOL AND DISTILLERY SLOP

[75] Inventor: Ferris C. Standiford, Greenbank, Wash.

[73] Assignee: Resources Conservation Co., Seattle, Wash.

[*] Notice: The portion of the term of this patent subsequent to May 4, 1999 has been disclaimed.

[21] Appl. No.: 442,178

[22] Filed: Nov. 16, 1982

Related U.S. Application Data

[60] Continuation-in-part of Ser. No. 331,205, Dec. 16, 1981, Pat. No. 4,381,220, which is a division of Ser. No. 206,170, Nov. 12, 1980, Pat. No. 4,328,074.

[51] Int. Cl.³ .......................... B01D 1/28; B01D 3/16
[52] U.S. Cl. .................................... 203/19; 159/24 B; 203/24; 203/26
[58] Field of Search ................. 159/24 B, 17 R, 17 P, 159/17 VS, 17 C, DIG. 8, 18, 19; 203/19, 24, 26, 71, 73-75, 77, 78, 80, 81, 82, 84, 91, 93, 94, 98, DIG. 13; 568/913, 916; 202/174

[56] References Cited

U.S. PATENT DOCUMENTS

1,427,888 9/1922 Winter ................................... 203/19

Primary Examiner—Frank Sever
Attorney, Agent, or Firm—Finnegan, Henderson, Farabow, Garrett & Dunner

[57] ABSTRACT

Concentrated alcohol and distillery slop are produced from fermented beer with a reduced amount of energy by use of a multiple effect distillery slop evaporator in which evaporator vapors from one or more effects are used to strip alcohol from the fermented liquor before they are returned as heat source for the next succeeding effect, and by using vents from the partial condensation of these vapors in an evaporator effect as the principal heat and alcohol source for the rectification system. Condensed vapors from the vented evaporators and the bottom stream from the rectifier are stripped of their remaining alcohol content in a condensate stripper. The overhead stream from the condensate stripper can also be used as a heat source for an evaporator effect before being fed to the rectification system as a source of heat and alcohol.

22 Claims, 6 Drawing Figures

PRODUCTION OF CONCENTRATED ALCOHOL AND DISTILLERY SLOP

CROSS-REFERENCE TO RELATED APPLICATION

This application is a continuation-in-part of application Ser. No. 331,205, filed Dec. 16, 1981, now U.S. Pat. No. 4,381,220, which is a division of application Ser. No. 206,170, filed Nov. 12, 1980, now U.S. Pat. No. 4,328,074.

BACKGROUND OF THE INVENTION

The present invention relates to an improved process and system for producing alcohol by fermentation.

In a conventional plant for the production of alcohol by fermentation, the "beer" from the fermenters is sent first to a distillation column or columns. Here the alcohol is stripped from the beer and is concentrated to remove most of the water. The energy for stripping and concentrating the alcohol comes from steam injected at the bottom of the column or columns. The spent beer from the distillation system is called "distillery slop" and has value as an animal feed if much of its water content is removed. Otherwise, its disposal could be a serious problem. Concentrating this slop to produce animal feed consequently has long been an industry practice, usually by use of multiple-effect evaporators.

The energy requirement for producing alcohol with the conventional process and system has been so high that the cost of producing the alcohol has been about the same as its fuel value. More specifically, the distillation column in the conventional plant has two basic sections, the beer still and the rectifier. The beer still is located below the point of beer addition, and steam is admitted at the bottom to strip out the alcohol. Alcohol losses with the slop can be minimized by increasing steam input or providing more plates or trays in the beer still, but these expedients increase either capital expenditures or operating costs and therefore must be balanced against the increased recovery of alcohol.

Above the beer still is the rectifier section, which serves to separate alcohol from water, with the alcohol leaving at the top and the water, from both the beer and the added steam, leaving as a diluent of the slops at the bottom. The total distillation section may have on the order of 50 plates and use on the order of 20 pounds of steam per gallon of 190 proof alcohol produced. The large number of plates requires such a tall vessel height that the column is frequently split into two sections, one section being the beer still with about 20 plates and the other the rectifier with about 30 plates.

The slop withdrawn from the bottom of the beer still is then concentrated, usually by use of multiple effect evaporators, which requires still more energy. As indicated above, the amount of energy necessary for concentrating the alcohol and distillery slop presently has about the same value as the alcohol that is produced.

A solution to these problems is disclosed in Ser. No. 206,170, the parent application of the present application, which discloses integrating the alcohol distillation and slop concentration in a highly efficient process and system employing a vapor recompression evaporator for slop concentration by employing evaporator vapors as the stripping steam for removing alcohol from the beer, by using the condensing side of the evaporator heating surfaces as a means of enriching the alcohol, and by using the evaporator vents as the source of alcohol and of heat for bringing the alcohol up to desired concentration. According to the process and system of the previous disclosure, all of the energy savings were in terms of thermal (steam) energy, with little or no change in the amount of mechanical (electrical) energy needed to drive the compressor.

On the other hand, another desirable objective in industrial plants is to achieve cogeneration of thermal and mechanical energy requirements, which places constraints on the relative amounts of thermal and mechanical energy used. A study by Raphael Katzen Associates for the Department of Energy (HCP/J6639-01) includes a partial attempt to achieve this objective in an ethanol plant. High pressure steam is generated in a boiler using coal as a fuel. This steam is expanded through a turbine to drive the evaporator's vapor compressor. The low pressure turbine exhaust steam then provides most of the thermal energy needs of the plant, the largest ones being in the distillation and mashing sections. Finally, the stack gas of the boiler is used to dry the spent grain and concentrated slop from the evaporator. Although this system reduces the mechanical energy required, it is far less efficient than the system disclosed in my previous application.

SUMMARY OF THE INVENTION

I have now found that the principles of my previous application can be applied not only to save thermal energy, but also to save mechanical energy, by using steam instead of a vapor compressor as the source of energy. This results in about a 50% reduction in the requirement for turbine exhaust steam compared to Katzen's projection and, consequently, only half as much boiler fuel, half as much turbine power to drive the vapor compressor, and half as much stack gas to drive the spent grain. Furthermore, only about half the compressor power must be supplied by purchased electricity. Thus, with the present invention, a substantial reduction in either fuel bills or purchased electricity may be achieved. In other words, it is an object of the present invention to broaden the utility of the principles of my previous application to encompass situations where the desirability of cogeneration makes it preferable that the evaporator may optionally be driven by heat energy instead of mechanical energy.

The principal object of the invention remains the conservation of energy, optionally in terms of steam, for the combined distillation/evaporation system.

Additional objects and advantages of the invention will be set forth in part in the description which follows, and in part will be obvious from the description or may be learned by practice of the invention. The objects and advantages of the invention may be realized and attained by means of the instrumentalities and combinations particularly pointed out in the appended claims.

To achieve the foregoing objects and in accordance with the purpose of the invention, as embodied and broadly described herein, the process for producing concentrated alcohol and distillery slop from fermented beer with a reduced amount of energy according to the present invention comprises: (a) feeding the beer to a beer still; (b) feeding a portion of a vapor mixture, derived from step (e) hereinbelow, to the still; (c) withdrawing an alcohol-rich vapor as the overhead from the still; (d) withdrawing an alcohol-poor distillery slop as the bottom stream from the still; (e) passing the slop from the still to a multiple effect evaporator to concentrate the slop by evaporating a water and alcohol vapor mixture therefrom; (f) passing the vapor from the overhead of the still to one of the effects of the evaporator into indirect heat exchange contact with the slop to condense a portion of the vapor and form a condensate: (g) passing the condensate from the one effect of the evaporator to a condensate stripper and withdrawing an alcohol-rich stream as the overhead from the stripper and an alcohol-poor stream as the bottom stream from the stripper; (h) feeding a portion of the vapor mixture derived from step (e) hereinabove to the stripper; (i) passing the uncondensed vapor from the one effect of the evaporator to a rectifier to supply substantially all the sensible heat of the vapor to the rectifier and withdrawing concentrated alcohol as the overhead from the rectifier and an alcohol-containing mixture as the bottom stream from the rectifier; (j) passing the alcohol-containing mixture from the rectifier to the stripper for admixture with the condensate from the one effect of the evaporator; and (k) withdrawing the concentrated slop from the last effect of the evaporator.

The source of energy to the system is preferably steam, which preferably is fed to the first effect of the multiple effect evaporator in indirect heat exchange contact with the slop to concentrate the slop by evaporating a water and alcohol vapor mixture therefrom.

It is also preferred to pass the alcohol-rich stream from the stripper to one of the effects of the evaporator into indirect heat exchange contact with the slop to condense a portion of the stream, and to pass the remaining portion of the stream to a rectifier to supply substantially all the sensible heat of the remaining portion to the rectifier.

Further to achieve the foregoing objects and in accordance with the purpose of the invention, as embodied and broadly described herein, the system for producing concentrated alcohol and distillery slop from fermented beer with a reduced amount of energy according to the invention comprises: (a) a beer still; (b) means for feeding the beer to the still; (c) means for feeding a portion of a vapor mixture, withdrawn from evaporating means (f) hereinbelow, to the still; (d) means for withdrawing an alcohol-rich vapor as the overhead from the still; (e) means for withdrawing an alcohol-poor distillery slop as the bottom stream from the still; (f) multiple effect evaporator means for concentrating the slop by evaporating a water and alcohol vapor mixture therefrom; (g) means for passing the slop from the still to the evaporator means; (h) means for passing the vapor from the overhead of the still to one of the effects of the evaporator means into indirect heat exchange contact with the slop to condense a portion of the vapor and form a condensate; (i) condensate stripper means for separating the condensate into an alcohol-rich overhead stream and an alcohol-poor stream; (j) means for passing the condensate from the one effect of the evaporator means to the condensate stripper means; (k) means for feeding a portion of the vapor mixture withdrawn from the evaporator means to the stripper means; (l) rectifier means for separating uncondensed vapor from the evaporator means into a concentrated alcohol overhead stream and an alcohol-containing mixture as a bottom stream; (m) means for passing the uncondensed vapor from the one effect of the evaporator means to the rectifier means; (n) means for passing the alcohol-containing mixture from the rectifier means to the stripper means for admixture with the condensate from the one effect of the evaporator means; and (o) means for withdrawing the concentrated slop from the last effect of the evaporator means.

The system preferably further comprises means for feeding steam to the first effect of the multiple effect evaporator means The system also preferably includes means for passing the alcohol-rich stream from the condensate stripper means to one of the effects of the evaporator means into indirect heat exchange contact with the slop to condense a portion of the stream, and means for passing the remaining portion of the stream to rectifier means.

The accompanying drawings, which are incorporated in and constitute a part of this specification, illustrate two embodiments of the invention and, together with the description, serve to explain the principles of the invention.

DESCRIPTION OF THE PREFERRED EMBODIMENTS

Reference will now be made in detail to the presently preferred embodiments of the invention, two examples of which are illustrated in the accompanying drawings.

The preferred embodiments of the system for producing concentrated alcohol and distillery slop from fermented beer with a reduced amount of energy according to the present invention are illustrated in the drawings of the present application and in the drawings of parent application Ser. No. 206,170, which application is incorporated herein by reference. "Fermented beer" can include, for example, ethanol-water mixtures. Beer is fed to beer still 1 through line 2 to form an alcohol-rich vapor withdrawn as overhead stream 3 and an alcohol-poor distillery slop withdrawn as bottom stream 4.

The driving force for the separation in the beer still may be compressed vapor from the multiple effect evaporator, as disclosed in Ser. No. 206,170, but preferably, as embodied herein, is prime steam supplied to the first effect of the multiple effect evaporator means through line 5. The steam evaporates a water and alcohol vapor mixture from the slop in the first effect of the evaporator through indirect heat exchange contact.

In accordance with the invention, the slop from the still is fed to a multiple effect evaporator means to concentrate the slop by evaporating a water and alcohol vapor mixture therefrom. As embodied herein, the multiple effect evaporator means is a multiple effect evaporator with five effects. A smaller or larger number of effects may be used. The preferred type of evaporator means is a falling film evaporator, such as falling film evaporator 7, but other types of evaporators may be employed. The distillery slop from the bottom of the still is concentrated in the evaporator by withdrawing water vapor from the slop in the evaporator through line 8. One of the advantages of the present invention is that the steam need not be at as high a pressure as normal, so that the plant's turbine can exhaust at a lower pressure, permitting generation of more power from a given amount of high pressure steam. The power produced by a source of high pressure steam could be used to drive a generator to produce most or all of the electricity used, mainly by the many motors, in such a plant. The savings achieved are therefore in terms of the cost of electricity, which is a higher grade and consequently usually more expensive form of energy than boiler fuel.

Figures 1, 1A:
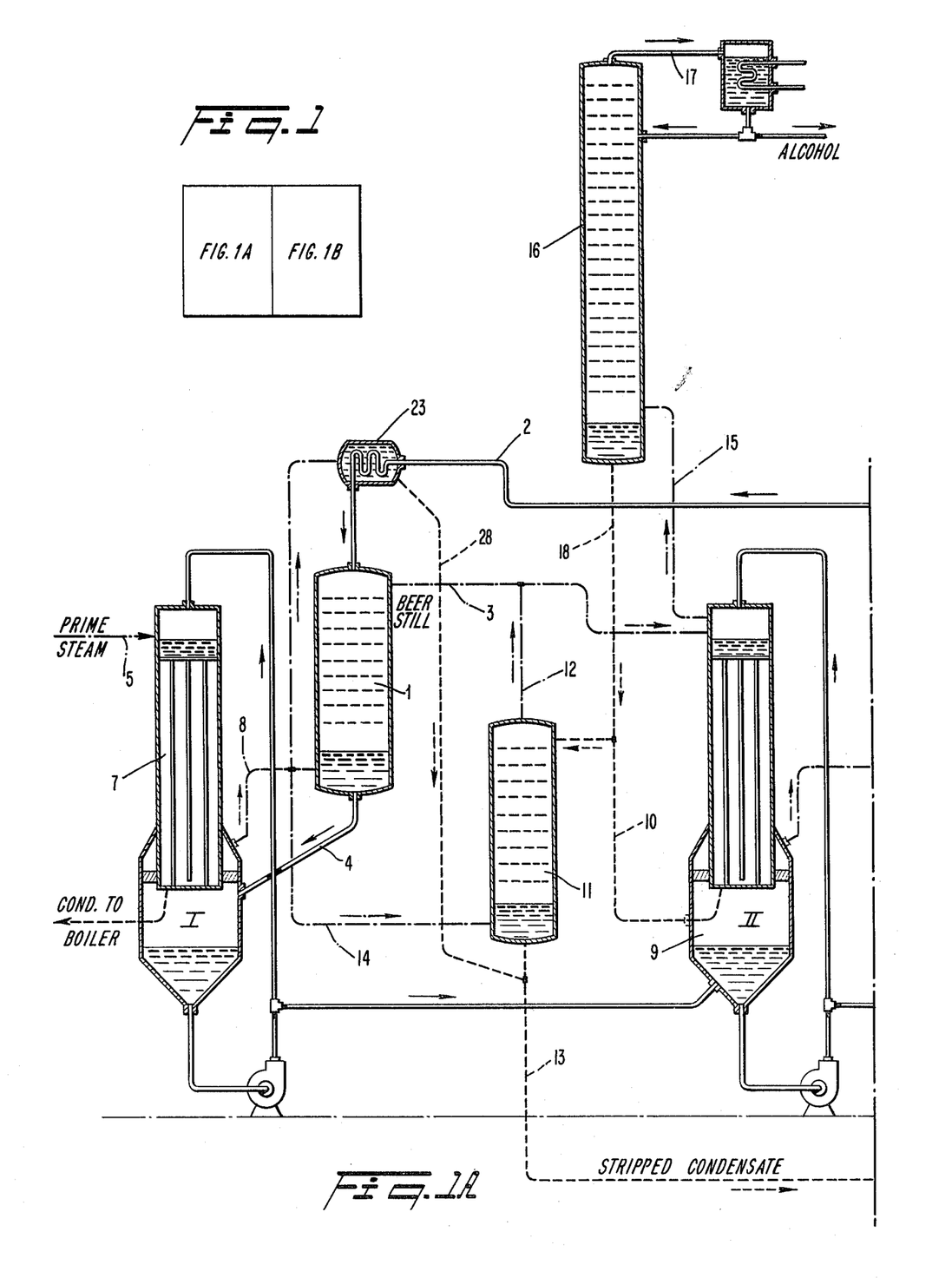
FIG. 1 shows the sum of the parts of FIGS. 1A & 1B.
FIG. 1A shows the first half of a first embodiment of the invention.
Figure 1B:
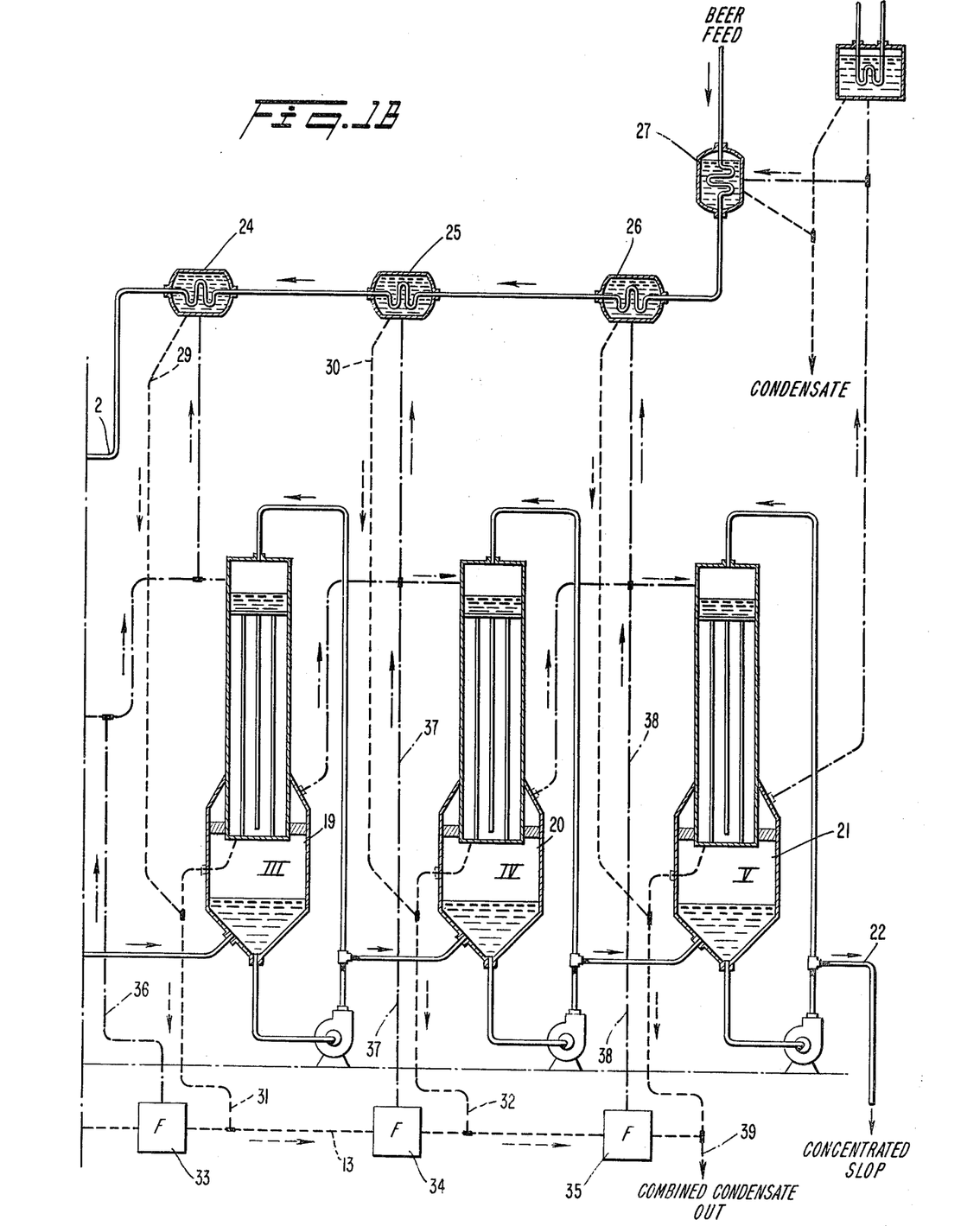
FIG. 1B shows the second half of the first embodiment of the invention.
Figures 2, 2A:
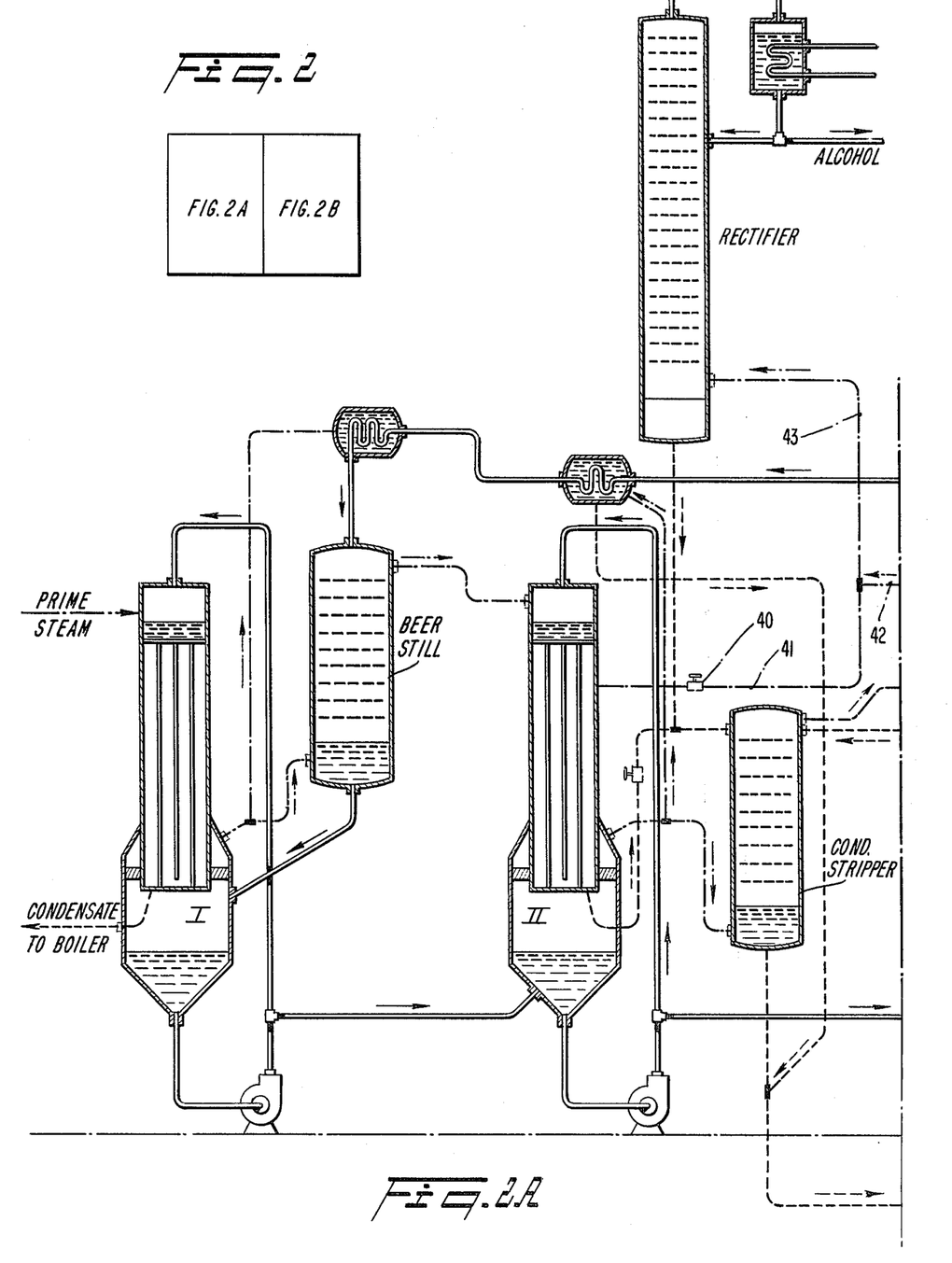
FIG. 2 shows the sum of the parts of FIGS. 2A & 2B.
FIG. 2A shows the first half of a second embodiment of the invention.
Figure 2B:
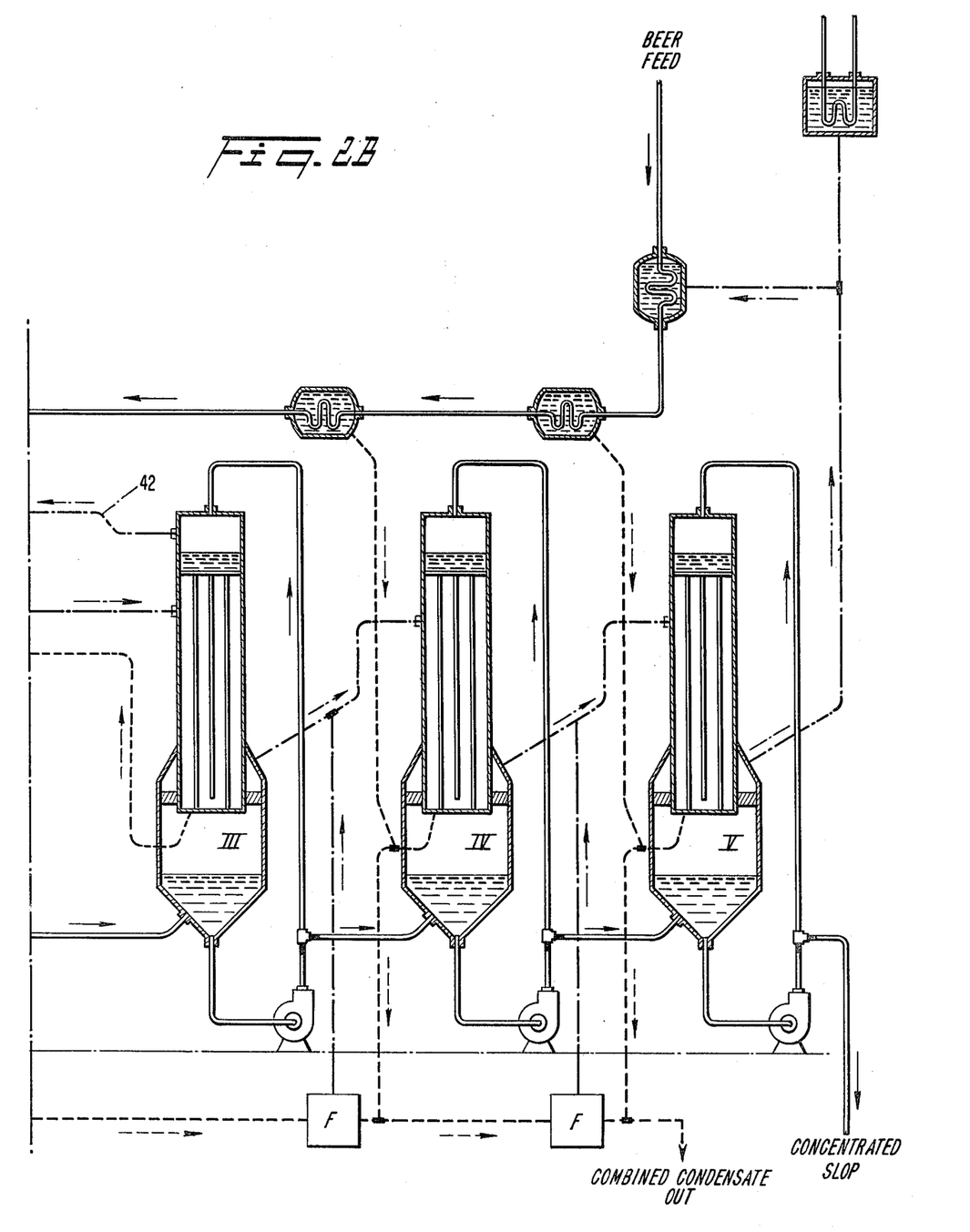
FIG. 2B shows the second half of the second embodiment of the invention.

The turbine exhaust steam fed to the first effect of the multiple effect evaporator typically has a pressure of about 30 psig. Normally, in such an evaporator, the vapor withdrawn through line 8 at, typically, about 15 psig would heat the second effect boiling at some lower absolute pressure, and the vapor from the second effect would heat the next effect boiling at still a lower pressure, etc. In accordance with the present invention, however, a distillation system is interposed between two or more effects of the evaporator. As embodied in FIG. 1, the distillation system is shown between the first and second effects. In the embodiment of FIG. 2, the distillation system is shown partly between the first and second effects and partly between the second and third effects.

In accordance with the invention, a portion of the vapor mixture derived from the multiple effect evaporator is fed to the still to provide the heat to drive the still. As embodied in FIG. 1, vapor from the first effect 7 passes through the beer still 1 (and also the condensate stripper means, as discussed below) before going to the second effect 9 thus carrying the alcohol to the second effect. The evaporation rate in the first effect is normally quite high relative to the amount of alcohol to be recovered, so that very efficient removal of alcohol from the beer and the condensate can be achieved while using only relatively few plates in the beer still and the condensate stripper means.

Further in accordance with the invention, vapor from the overhead of the still is passed to one of the effects of the evaporator into indirect heat exchange contact with the slop to condense a portion of the vapor and form a condensate. As illustrated in FIG. 1, vapor from the overhead of still 1 passes through line 3 to the second effect 9 of the multiple effect evaporator. Most of the alcohol-containing vapors are condensed in the second effect to form condensate stream 10. The condensate from the effect to which the overhead of the still is passed is fed to a condensate stripper means, in accordance with the invention, from which are withdrawn an alcohol-rich stream as the overhead and an alcohol-poor stream as the bottom stream. As illustrated in FIG. 1, the condensate from the second effect is fed through line 10 to condensate stripper 11 from which are withdrawn overhead stream 12 and bottom stream 13.

Further in accordance with the invention, a portion of the vapor mixture from the multiple effect evaporator is fed to the stripper means to provide the driving force for the stripper means. As embodied in FIG. 1, line 14 carries a portion of the vapor from the first effect to stripper 11.

In accordance with the invention, the uncondensed vapor from the effect to which the overhead of the still was fed is passed to a rectifier means to supply substantially all the sensible heat of the vapor to the rectifier means, from which are withdrawn concentrated alcohol as the overhead stream and an alcohol-containing mixture as the bottom stream. As embodied in FIG. 1, the uncondensed vapor from the second effect passes through line 15 to rectifier 16, and concentrated alcohol is withdrawn as overhead stream 17 while an alcohol-containing mixture is withdrawn as bottom stream 18. The uncondensed vapor from the second effect contains most of the alcohol.

The bottom stream from the rectifier, like the condensate from the second effect, also contains alcohol. Consequently, in accordance with the invention, the alcohol-containing mixture from the rectifier is passed to the stripper for admixture with the condensate from the effect of the evaporator to which the overhead from the still is passed. As shown in FIG. 1, the bottom stream 18 from the rectifier is mixed with the condensate stream 10 and fed to condensate stripper 11.

The slop from the second effect is preferably fed to successive effects 19, 20, and 21, operating at successively lower temperatures and pressures, to be further concentrated. Finally, in accordance with the invention, concentrated slop is withdrawn from the last effect of the evaporator. This is illustrated in FIG. 1 by line 22.

As can be seen, the alcohol distillation system of the present invention is substantially the same as in parent application Ser. No. 206,170, except that the steam for its operation may come from a higher temperature effect rather than from a compressor. As is apparent, a complete alcohol-dehydration system could be added downstream of the rectifier in exactly the same manner as disclosed in the parent application.

One advantage of the embodiment employing steam rather than vapor compression, however, is that the former has large heat sources and heat sinks and a number of temperature levels below that of the alochol recovery system. Heat can therefore be removed from, or returned to, any of the effects of the evaporator as a means of conversing thermal energy. For example, a portion of the water and alcohol-vapor mixture from the multiple effect evaporator may be passed into indirect heat exchange contact with the beer upstream of the beer still to preheat the beer. This is illustrated in the drawings, in which heat is extracted as vapor from each effect of the evaporator for preheating the feed to the beer still in heat exchangers 23, 24, 25, 26, and 27.

Another example is the recovery of heat from the water condensed in each effect and from the stripped condensate by flashing the bottom stream from the stripper and the condensate from some of the effects of the mwltiple effect evaporator to form flashed vapors that can be passed into indirect heat contact with effects of the evaporator operating at the pressure of each respective flashed vapor to concentrate the slop in each respective effect. This is illustrated in the drawings by condensate streams 28, 29, 30, 13, 31, and 32, flash units 33, 34, and 35, and vapor streams 36, 37, and 38. Combined condensate is withdrawn from the system through line 39.

A close comparison of the embodiment employing steam with the embodiment employing vapor compression will show that the incremental energy consumption for alcohol distillation is essentially the same, and much lower than can be achieved by conventional means. In both embodiments, the high steam flows used in the beer still and the condensate stripper are almost free of cost, because the heat in the extra steam is recovered for further evaporation. The main energy requirement for distillation is provided by the vent carrying alcohol-laden vapor from the evaporator to the rectifier. In the vapor compression embodiment, this vent can be compensated for by the addition of makeup steam to the final stage of slop concentration. This makeup steam evaporates approximately its own weight of water from the slop before the contained heat leaves the evaporator system to the distillation system. In the embodiment employing steam as the primary source of energy, the heat represented by the vent is supplied by extra prime steam to the first effect, which also evaporates approximately its own weight of water from the slop before the contained heat leaves the evaporator system to the distillation system, if the distillation system is provided between the first and second effects as shown in the embodiment of FIG. 1.

FIG. 2 illustrates another embodiment utilizing prime steam to the first effect, which is preferred if the alcohol content of the beer is high or a large number of effects is used in the evaporator. Under such circumstances, the amount of vapor from any one effect may be insufficient for efficient heating of both the beer still and the condensate stripper. It may be desirable to divide the stripping duty between the vapor from several effects. Thus, unlike the embodiment of FIG. 1, in which the water and alcohol vapor mixture from the first effect is fed to both the still and the stripper, in the embodiment of FIG. 2 the vapor from the first effect is fed to the still while the vapor from the second effect is fed to the stripper. Alcohol-laden vapors from the beer still are partially condensed as the heat source for the second effect and residual vent vapor is then throttled down through valve 40 to the pressure of the third effect steam chest. Unlike the embodiment of FIG. 1, in which alcohol-laden vapors from the condensate stripper are partially condensed as the heat source for the second effect, in the embodiment of FIG. 2, alcohol-laden vapors from the condensate stripper are partially condensed as the heat source for the third effect, and the residual vent vapors are then joined with the throttled vapor flow from the second effect as the heat source for the rectifier. Instead of passing the uncondensed alcohol-laden vapors from the second and third effects to the same rectifier, as illustrated by lines 41, 42, and 43, separate rectifiers for the second and third effect vent vapors may be used to avoid the loss of available temperature difference that results from the throttling of second effect vents as illustrated.

Yet another possible variation within the scope of the invention would be to strip part of the beer with vapor from one effect and the rest of the beer with vapors from one or more of the other effects, since the beer still usually requires much more stripping steam than the condensate stripper.

As can be seen in the embodiments of both FIGS. 1 and 2, the alcohol-rich stream from the stripper is preferably passed to one of the effects of the evaporator into indirect heat exchange contact with the slop to condense a portion of the stream, and the remaining portion of the stream is passed to a rectifier to supply substantially all the sensible heat of the remaining portion to the rectifier. The condensate from the effect is then preferably combined with the bottom stream from the rectifier and fed to the condensate stripper for stripping of the alcohol. In the embodiment of FIG. 1, where both the still and the rectifier are provided between the first and second effects, only the condensate from the second effect is fed to the condensate stripper, while in the embodiment of FIG. 2, the condensates from the second and third effects are combined with the bottom stream from the rectifier and fed to the condensate stripper.

A less preferred alternative is to pass the overhead from the stripper directly to the rectifier, rather than transferring its heat to the slop in an evaporator. Passing the overhead from the stripper to the evaporator is far more efficient.

In another embodiment, the rectifier and condensate stripper can constitute a single unit otherwise operating in an identical manner to the separate rectifier and stripper. Thus, the "withdrawal" of the bottom stream from the rectifier in this embodiment is internal at the junction between the rectifier and the stripper, and the passage of the condensate from the evaporator to the stripper would occur at the same junction.

It will be apparent to those skilled in the art that various modifications and variations could be made in the process and system of the invention without departing from the scope or spirit of the invention. For example, while the flow of distillery slop through the evaporator is shown as forward feed (to the first effect from the beer still and then successively to the lower temperature effects), any other feed flow sequence may be used as is determined best for the particular situation. Also, any number of effects can be used, as determined by the usual balances between capital and operating costs.

What is claimed is:

1. A process for producing concentrated alcohol and distillery slop from fermented beer with a reduced amount of energy comprising:
   (a) feeding said beer to a beer still;
   (b) feeding a portion of a vapor mixture, derived from step (e) hereinbelow, to said still;
   (c) withdrawing an alcohol-rich vapor as the overhead from said still;
   (d) withdrawing an alcohol-poor distillery slop as the bottom stream from said still;
   (e) passing said slop from said still to a multiple effect evaporator to concentrate said slop by evaporating a water and alcohol vapor mixture therefrom;
   (f) passing said vapor from said overhead of said still to one of the effects of said evaporator into indirect heat exchange contact with said slop to condense a portion of said vapor and form a condensate;
   (g) passing said condensate from said one effect of said evaporator to a condensate stripper and withdrawing an alchol-rich stream as the overhead from said stripper and an alcohol-poor stream as the bottom stream from said stripper;
   (h) feeding a portion of said vapor mixture derived from step (e) hereinabove to said stripper;
   (i) passing the uncondensed vapor from said one effect of said evaporator to a rectifier to supply substantially all the sensible heat of said vapor to said rectifier and withdrawing concentrated alcohol as the overhead from said rectifier and an alcohol-containing mixture as the bottom stream from said rectifier;
   (j) passing said alcohol-containing mixture from said rectifier to said stripper for admixture with said condensate from said one effect of said evaporator; and
   (k) withdrawing said concentrated slop from the last effect of said evaporator.

2. A process according to claim 1, further comprising feeding steam to the first effect of said multiple effect evaporator in indirect heat exchange contact with said slop to concentrate said slop by evaporating a water and alcohol vapor mixture therefrom.

3. A process according to claim 2, further comprising passing said alcohol-rich stream from said stripper to one of the effects of said evaporator into indirect heat exchange contact with said slop to condense a portion of said stream, and passing the remaining portion of said stream to a rectifier to supply substantially all the sensible heat of said remaining portion to said rectifier.

4. A process according to claim 2, wherein the water and alcohol vapor mixture from the first effect of said multiple effect evaporator is the vapor mixture fed to both said still and to said stripper.

5. A process according to claim 2, wherein said water and alcohol vapor mixture from the first effect of said multiple effect evaporator is the vapor mixture fed to said still, and the water and alcohol vapor mixture from the second effect of said multiple effect evaporator is the vapor mixture fed to said stripper.

6. A process according to claim 5, wherein said multiple effect evaporator comprises at least three effects and uncondensed vapors from the second and third effects are passed to separate rectifiers.

7. A process according to claim 6, further comprising passing said alcohol-rich stream from said stripper to said third effect into indirect heat exchange contact with said slop to condense a portion of said stream, wherein said vapor from said overhead of said still is passed to said second effect.

8. A process according to claim 5, wherein said multiple effect evaporator comprises at least three effects and uncondensed vapors from the second and third effects are passed to the same rectifier.

9. A process according to claim 8, further comprising passing said alcohol-rich stream from said stripper to said third effect into indirect heat exchange contact with said slop to condense a portion of said stream, wherein said vapor from said overhead of said still is passed to said second effect.

10. A process according to claim 2, further comprising passing a portion of said water and alcohol vapor mixture from the multiple effect evaporator into indirect heat exchange contact with said beer upstream of said beer still to preheat said beer.

11. A process according to claim 2, further comprising flashing the bottom stream from said stripper and flashing condensate from some of the effects of said multiple effect evaporator to form flashed vapors, and passing said flashed vapors into indirect heat exchange contact with effects of said multiple effect evaporator operating at the pressure of each respective flashed vapor to concentrate the slop in each respective effect.

12. A system comprising elements designed, dimensioned and arranged for producing concentrated alcohol and distillery slop from fermented beer with a reduced amount of energy including:
 (a) a beer still;
 (b) means for feeding said beer to said still;
 (c) means for feeding a portion of a vapor mixture, withdrawn from evaporating means (f) hereinbelow, to said still;
 (d) means for withdrawing an alcohol-rich vapor as the overhead from said still;
 (e) means for withdrawing an alcohol-poor distillery slop as the bottom stream from said still;
 (f) multiple effect evaporator means for concentrating said slop by evaporating a water and alcohol vapor mixture therefrom;
 (g) means for passing said slop from said still to said evaporator means;
 (h) means for passing said vapor from said overhead of said still to one of the effects of said evaporator means into indirect heat exchange contact with said slop to condense a portion of said vapor and form a condensate;
 (i) condensate stripper means for separating said condensate into an alcohol-rich overhead stream and an alcohol-poor bottom stream;
 (j) means for passing said condensate from said one effect of said evaporator means to said condensate stripper means;
 (k) means for feeding a portion of said vapor mixture withdrawn from said evaporator means to said stripper means;
 (l) rectifier means for separating uncondensed vapor from said evaporator means into a concentrated alcohol overhead stream and an alcohol-containing mixture as a bottom stream;
 (m) means for passing the uncondensed vapor from said one effect of said evaporator means to said rectifier means;
 (n) means for passing said alcohol-containing mixture from said rectifier means to said stripper means for admixture with said condensate from said one effect of said evaporator means; and
 (o) means for withdrawing said concentrated slop from the last effect of said evaporator means.

13. A system according to claim 12, further comprising means for feeding steam to the first effect of said multiple effect evaporator means.

14. A system according to claim 13, further comprising means for passing said alcohol-rich stream from said condensate stripper means to one of the effects of said evaporator means into indirect heat exchange contact with said slop to condense a portion of said stream, and means for passing the remaining portion of said stream to rectifier means.

15. A system according to claim 13, wherein said means for feeding a portion of a vapor mixture withdrawn from evaporator means (f) to said still comprises means for feeding the vapor mixture from the first effect of said multiple effect evaporator means to both said still and said stripper means.

16. A system according to claim 13, wherein said means for feeding a portion of a vapor mixture withdrawn from evaporator means (f) to said still comprises means for feeding said vapor mixture from the first effect of said multiple effect evaporator means to said still, further comprising means for feeding the vapor mixture from the second effect of said multiple effect evaporator means to said stripper means.

17. A system according to claim 16, wherein said multiple effect evaporator means comprises at least three effects and said rectifier means comprises two rectifiers, further comprising means for passing uncondensed vapors from the second and third effects to separate rectifiers.

18. A system according to claim 17, further comprising means for passing said alcohol-rich stream from said stripper means to said third effect into indirect heat exchange contact with said slop to condense a portion of said stream, wherein said means for passing said vapor from said overhead of said still to one of the effects of said evaporator means comprises means for passing said vapor to said second effect.

19. A system according to claim 16, wherein said multiple effect evaporator means comprises at least three effects and said rectifier means comprises a single rectifier, further comprising means for passing uncondensed vapors from the second and third effects to said rectifier.

20. A system according to claim 19, further comprising means for passing said alcohol-rich stream from said stripper means to said third effect into indirect heat exchange contact with said slop to condense a portion of said stream, wherein said means for passing said vapor from said overhead of said still to one of the effects of said evaporator means comprises means for passing said vapor to said second effect.

21. A system according to claim 13, further comprising heat exchange means for preheating said beer upstream of said beer still and means for passing a portion of said water and alcohol vapor mixture from said multiple effect evaporator means to said heat exchange means into indirect heat exchange contact with said beer.

22. A system according to claim 13, further comprising means for flashing the bottom stream from said stripper means and means for flashing condensate from some of the effects of said multiple effect evaporator means to form flashed vapors, and means for passing said flashed vapors into indirect heat exchange contact with effects of said multiple effect evaporator means operating at the pressure of each respective flashed vapor to concentrate the slop in each respective effect.

* * * * *